US011062678B2

(12) United States Patent
Zavesky et al.

(10) Patent No.: US 11,062,678 B2
(45) Date of Patent: Jul. 13, 2021

(54) SYNCHRONIZATION OF ENVIRONMENTS DURING EXTENDED REALITY EXPERIENCES

(71) Applicant: AT&T Intellectual Property I, L.P., Atlanta, GA (US)

(72) Inventors: Eric Zavesky, Austin, TX (US); Zhu Liu, Marlboro, NJ (US); David Crawford Gibbon, Lincroft, NJ (US); Behzad Shahraray, Holmdel, NJ (US); Paul Triantafyllou, Summit, NJ (US); Tan Xu, Bridgewater, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 16/234,089

(22) Filed: Dec. 27, 2018

(65) Prior Publication Data

US 2020/0211506 A1 Jul. 2, 2020

(51) Int. Cl.
*G09G 5/12* (2006.01)
*H04L 12/66* (2006.01)
(Continued)

(52) U.S. Cl.
CPC ............... *G09G 5/12* (2013.01); *G06F 3/165* (2013.01); *G09G 2354/00* (2013.01);
(Continued)

(58) Field of Classification Search
CPC ....................................................... G09G 5/12
(Continued)

(56) References Cited

U.S. PATENT DOCUMENTS 6,396,495 B1 5/2002 Parghi et al.
9,311,718 B2 4/2016 Scavezze et al.
(Continued)

FOREIGN PATENT DOCUMENTS

CN 105843380 A 8/2016
CN 105972763 A 9/2016
(Continued)

OTHER PUBLICATIONS

Ischer, Matthieu, et al. "How incorporation of scents could enhance immersive virtual experiences." Frontiers in psychology 5 (2014): 736. https://www.frontiersin.org/articles/10.3389/fpsyg.2014.00736/full.

(Continued)

*Primary Examiner* — Shivang I Patel

(57) ABSTRACT

In one example, a method includes monitoring conditions in a real environment in which a user is present, wherein the monitoring is performed by collecting data about the conditions from a plurality of sensors located in the real environment, transmitting the data about the conditions to an extended reality device that is present in the real environment, where the extended reality device is configured to render a virtual environment, interpolating between the real environment and the virtual environment, based at least in part on the conditions, to determine an actual extended reality environment that is being presented to the user, and sending a signal to a device that is located in the real environment, based on the interpolating, wherein the signal instructs the device to take an action that modifies at least one of the conditions in the real environment.

19 Claims, 4 Drawing Sheets

(51) Int. Cl.
*G06F 3/16* (2006.01)
*H04L 12/28* (2006.01)

(52) U.S. Cl.
CPC .... *G09G 2370/022* (2013.01); *H04L 12/2816* (2013.01); *H04L 12/66* (2013.01)

(58) Field of Classification Search
USPC ........................................................ 345/520
See application file for complete search history.

(56) References Cited

U.S. PATENT DOCUMENTS

| | | | |
|---|---|---|---|
| 9,462,262 | B1 | 10/2016 | Worley et al. |
| 9,648,436 | B2 | 5/2017 | Kraft et al. |
| 9,914,057 | B2 | 3/2018 | Muhlheim et al. |
| 10,089,785 | B2 | 10/2018 | Demirli et al. |
| 10,146,194 | B2 | 12/2018 | Todeschini et al. |
| 2016/0048027 | A1 | 2/2016 | Shpigelman |
| 2016/0091877 | A1* | 3/2016 | Fullam .................. G05B 15/02 700/276 |
| 2016/0314624 | A1 | 10/2016 | Li et al. |
| 2016/0317866 | A1* | 11/2016 | Fung .................. A63B 24/0087 |
| 2017/0017083 | A1 | 1/2017 | Samec et al. |
| 2017/0225069 | A1* | 8/2017 | Goslin .................. A63F 13/428 |
| 2017/0243406 | A1 | 8/2017 | Yamazaki |
| 2017/0301140 | A1 | 10/2017 | Smith et al. |
| 2018/0063924 | A1 | 3/2018 | Alfier et al. |
| 2018/0211440 | A1 | 7/2018 | Kunkel et al. |
| 2018/0286080 | A1* | 10/2018 | Marshall .............. G02B 27/017 |

FOREIGN PATENT DOCUMENTS

| | | |
|---|---|---|
| WO | 2018057980 A1 | 3/2018 |
| WO | 2018093661 A1 | 5/2018 |

OTHER PUBLICATIONS

Jones, Brett R., et al. "IllumiRoom: peripheral projected illusions for interactive experiences." Proceedings of the SIGCHI Conference on Human Factors in Computing Systems. ACM, 2013. http://citeseerx.ist.psu.edu/viewdoc/download?doi=10.1.1.308.4384&rep=rep1&type=pdf.

Bobick, Aaron, et al. "The KidsRoom: A perceptually-based interactive and immersive story environment." Presence 8 (1999):369-393. http://hd.media.mit.edu/tech-reports/TR-398.pdf.

* cited by examiner

SYNCHRONIZATION OF ENVIRONMENTS DURING EXTENDED REALITY EXPERIENCES

The present disclosure relates generally to extended reality (XR) systems, and relates more particularly to devices, non-transitory computer-readable media, and methods for controlling connected home devices to synchronize a real environment with a virtual environment during the generation of an XR experience.

BACKGROUND

Extended reality (XR) is an umbrella term that has been used to refer to various different forms of immersive technologies, including virtual reality (VR), augmented reality (AR), mixed reality (MR), and cinematic reality (CR). Generally speaking, XR technologies allow virtual world (e.g., digital) objects to be brought into "real" (e.g., non-virtual) world environments and real world objects to be brought into virtual environments, e.g., via overlays or other mechanisms. XR technologies may have applications in fields including architecture, sports training, medicine, real estate, gaming, television and film, engineering, travel, and others. As such, immersive experiences that rely on XR technologies are growing in popularity.

SUMMARY

In one example, the present disclosure describes a device, computer-readable medium, and method for providing improved synchronization of real and virtual environments during extended reality (XR) experiences. For instance, in one example, a method includes monitoring conditions in a real environment in which a user is present, wherein the monitoring is performed by collecting data about the conditions from a plurality of sensors located in the real environment, transmitting the data about the conditions to an extended reality device that is present in the real environment, where the extended reality device is configured to render a virtual environment, interpolating between the real environment and the virtual environment, based at least in part on the conditions, to determine an actual extended reality environment that is being presented to the user, and sending a signal to a device that is present in the real environment, based on the interpolating, wherein the signal instructs the device to take an action that modifies at least one of the conditions in the real environment.

In another example, a non-transitory computer-readable medium stores instructions which, when executed by a processor, cause the processor to perform operations. The operations include monitoring conditions in a real environment in which a user is present, wherein the monitoring is performed by collecting data about the conditions from a plurality of sensors located in the real environment, transmitting the data about the conditions to an extended reality device that is present in the real environment, where the extended reality device is configured to render a virtual environment, interpolating between the real environment and the virtual environment, based at least in part on the conditions, to determine an actual extended reality environment that is being presented to the user, and sending a signal to a device that is present in the real environment, based on the interpolating, wherein the signal instructs the device to take an action that modifies at least one of the conditions in the real environment.

In another example, a device includes a processor and a computer-readable medium storing instructions which, when executed by the processor, cause the processor to perform operations. The operations include monitoring conditions in a real environment in which a user is present, wherein the monitoring is performed by collecting data about the conditions from a plurality of sensors located in the real environment, transmitting the data about the conditions to an extended reality device that is present in the real environment, where the extended reality device is configured to render a virtual environment, interpolating between the real environment and the virtual environment, based at least in part on the conditions, to determine an actual extended reality environment that is being presented to the user, and sending a signal to a device that is present in the real environment, based on the interpolating, wherein the signal instructs the device to take an action that modifies at least one of the conditions in the real environment.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one example, the present disclosure provides improved synchronization of real and virtual environments during extended reality (XR) experiences. As discussed above, immersive experiences that rely on XR technologies are growing in popularity. Accordingly, the quality of the hardware used to experience XR technologies continues to improve. However, from a software perspective, challenges remain in coordinating the real and virtual environments while initiating, persisting, and exiting an XR experience. Poor coordination between the real and virtual environments may result in awkward or jarring transitions, which can negatively affect the user experience.

Examples of the present disclosure leverage the availability of connected home devices (e.g., IoT devices, wearable smart devices, smart appliances, and the like) in a home or other real world locations in order to provide more seamless synchronization of real and virtual environments during XR experiences. For instance, a remote synchronization server may provide signals to control connected home devices, such as smart thermostats, smart lighting systems, smart audio systems, and the like in the real environment. In this manner, the synchronization server may exert stateful control over the real environment.

For instance, the synchronization server may send commands to a hub or controller in the home. Based on the data in the command, the controller may send instructions to the connected home devices to take actions that affect certain home systems and therefore modify the conditions of the real environment. For example, if the user is playing an XR-based video game that takes place in a desert location, the controller may (based on the command) instruct a smart thermostat to temporarily raise the temperature in the room in which the user is playing and/or instruct a smart dimming switch to brighten the lighting in the room. Thus, examples of the present disclosure may provide more immersive XR experiences through improved synchronization of the real and virtual environments. Further examples of the present disclosure may improve transitions between the real and virtual environments in a similar manner. For instance, when the user sends a signal to exit an XR environment in which the lighting is relatively dim, the controller may (based on the command) send a signal to the lighting system of the real environment to brighten the ambient lighting gradually (e.g., over a period of time such as over a minute, several minutes, and so on), rather than immediately increase to full brightness.

Figure 1:
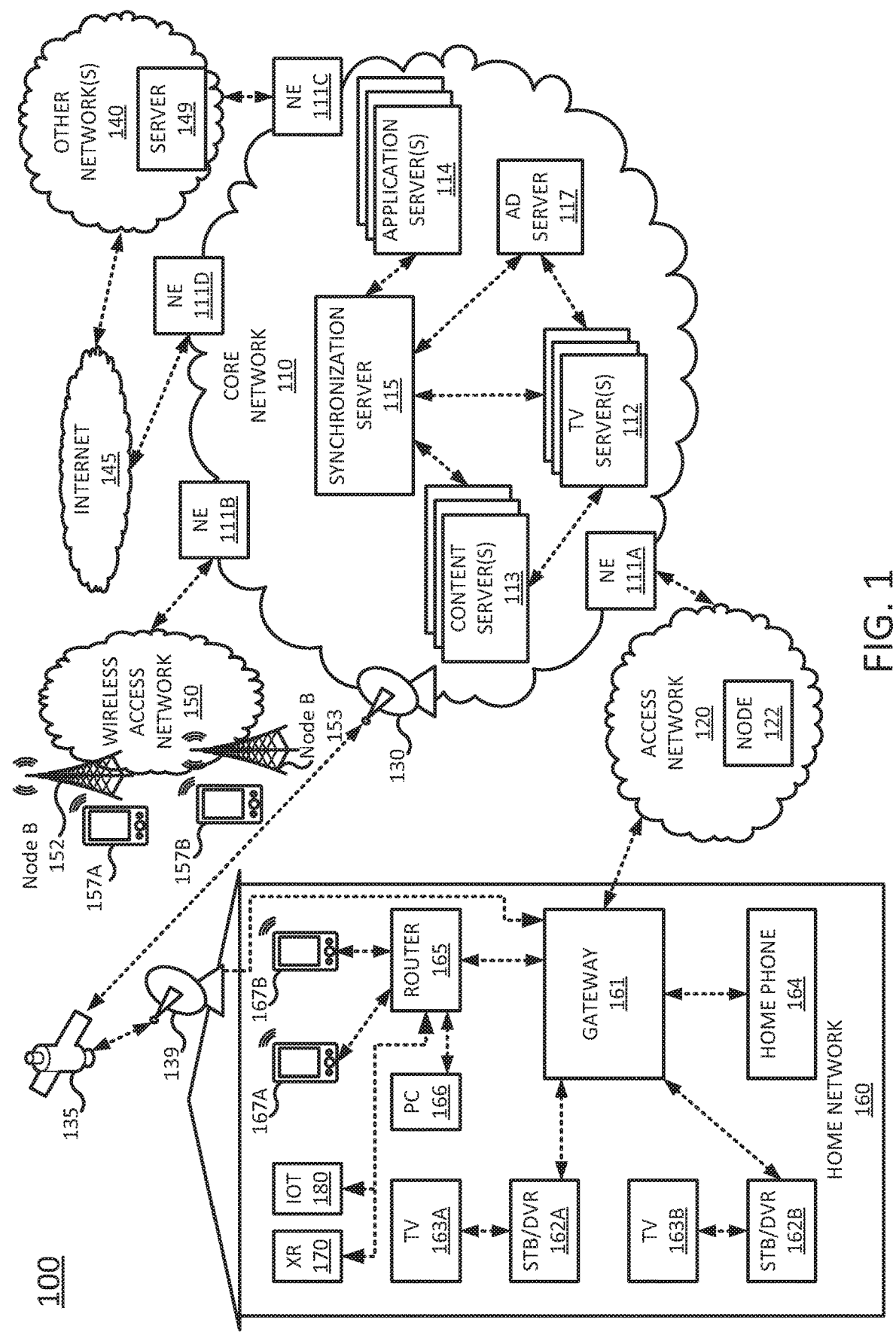
FIG. 1 illustrates an example network related to the present disclosure.

To better understand the present disclosure, FIG. 1 illustrates an example network 100, related to the present disclosure. As shown in FIG. 1, the network 100 connects mobile devices 157A, 157B, 167A and 167B, and home network devices such as home gateway 161, set-top boxes (STBs) 162A, and 162B, television (TV) 163A and TV 163B, home phone 164, router 165, personal computer (PC) 166, and so forth, with one another and with various other devices via a core network 110, a wireless access network 150 (e.g., a cellular network), an access network 120, other networks 140 and/or the Internet 145.

In one example, wireless access network 150 comprises a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, wireless access network 150 may comprise an access network in accordance with any "second generation" (2G), "third generation" (3G), "fourth generation" (4G), Long Term Evolution (LTE) or any other yet to be developed future wireless/cellular network technology including "fifth generation" (5G) and further generations. While the present disclosure is not limited to any particular type of wireless access network, in the illustrative example, wireless access network 150 is shown as a UMTS terrestrial radio access network (UTRAN) subsystem. Thus, elements 152 and 153 may each comprise a Node B or evolved Node B (eNodeB).

In one example, each of mobile devices 157A, 157B, 167A, and 167B may comprise any subscriber/customer endpoint device configured for wireless communication such as a laptop computer, a Wi-Fi device, a Personal Digital Assistant (PDA), a mobile phone, a smartphone, an email device, a computing tablet, a messaging device, a wearable smart device (e.g., a smart watch or fitness tracker), a gaming console, and the like. In one example, any one or more of mobile devices 157A, 157B, 167A, and 167B may have both cellular and non-cellular access capabilities and may further have wired communication and networking capabilities.

As illustrated in FIG. 1, network 100 includes a core network 110. In one example, core network 110 may combine core network components of a cellular network with components of a triple play service network; where triple play services include telephone services, Internet services and television services to subscribers. For example, core network 110 may functionally comprise a fixed mobile convergence (FMC) network, e.g., an IP Multimedia Subsystem (IMS) network. In addition, core network 110 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Core network 110 may also further comprise a broadcast television network, e.g., a traditional cable provider network or an Internet Protocol Television (IPTV) network, as well as an Internet Service Provider (ISP) network. The network elements 111A-111D may serve as gateway servers or edge routers to interconnect the core network 110 with other networks 140, Internet 145, wireless access network 150, access network 120, and so forth. As shown in FIG. 1, core network 110 may also include a plurality of television (TV) servers 112, a plurality of content servers 113, a plurality of application servers 114, an advertising server (AS) 117, and a synchronization server 115 (e.g., an application server). For ease of illustration, various additional elements of core network 110 are omitted from FIG. 1.

With respect to television service provider functions, core network 110 may include one or more television servers 112 for the delivery of television content, e.g., a broadcast server, a cable head-end, and so forth. For example, core network 110 may comprise a video super hub office, a video hub office and/or a service office/central office. In this regard, television servers 112 may interact with content servers 113, advertising server 117, and synchronization server 115 to select which video programs, or other content and advertisements to provide to the home network 160 and to others.

In one example, content servers 113 may store scheduled television broadcast content for a number of television channels, video-on-demand programming, local programming content, gaming content, and so forth. The content servers 113 may also store other types of media that are not audio/video in nature, such as audio-only media (e.g., music, audio books, podcasts, or the like) or video-only media (e.g., image slideshows). For example, content providers may upload various contents to the core network to be distributed to various subscribers. Alternatively, or in addition, content providers may stream various contents to the core network for distribution to various subscribers, e.g., for live content, such as news programming, sporting events, and the like. In one example, advertising server 117 stores a number of advertisements that can be selected for presentation to viewers, e.g., in the home network 160 and at other downstream viewing locations. For example, advertisers may upload various advertising content to the core network 110 to be distributed to various viewers.

In one example, synchronization server 115 may collect data from sensors located in the home network, such as sensors integrated into IoT devices 180, mobile devices 167A and 167B, wearable smart devices (not shown), XR device 170, and/or other devices. The data collected from the sensors may include information about conditions (e.g., temperature, lighting, noise volume, obstacles, etc.) within the home network and/or information about a user (e.g., heart rate, blood pressure, breathing patterns, etc.) who is connected to the home network. The synchronization server 115 may also collect data from the XR device 170 relating to conditions (e.g., temperature, lighting, noise volume, etc.) in a virtual environment being rendered by the XR device 170. As discussed in further detail in connection with FIG. 2, the synchronization server 115 may determine an actual XR environment being experienced by a user, based on the data collected from the sensors and from the XR device 170. The synchronization server 115 may further determine a difference between the actual XR environment being experienced by the user and a target XR environment (e.g., the XR environment that the user is supposed to be experiencing, or an ideal XR environment). The synchronization server 115 may further send commands to the XR device 170, IoT devices 180, and/or mobile devices 167A and 167B (e.g., via home gateway 161) that cause the XR device 170, IoT devices 180, and/or mobile devices 167A and 167B to take actions that modify the conditions of the real and/or virtual environments in a manner that minimizes the difference between the actual XR environment being experienced by the user and the target XR environment.

Figure 4:
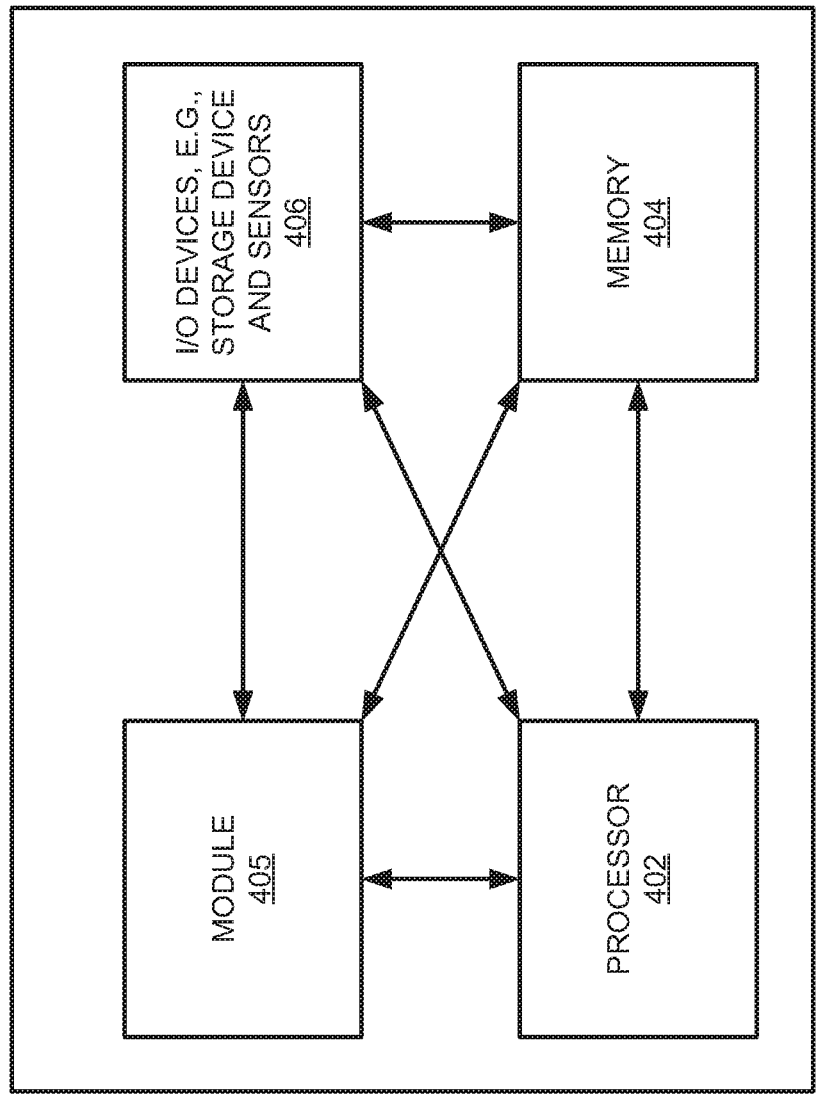
FIG. 4 depicts a high-level block diagram of a computing device specifically programmed to perform the functions described herein.

In one example, any or all of the television servers 112, content servers 113, application servers 114, synchronization server 115, and advertising server 117 may comprise a computing system, such as computing system 400 depicted in FIG. 4.

In one example, the access network 120 may comprise a Digital Subscriber Line (DSL) network, a broadband cable access network, a Local Area Network (LAN), a cellular or wireless access network, a $3^{rd}$ party network, and the like. For example, the operator of core network 110 may provide a cable television service, an IPTV service, or any other type of television service to subscribers via access network 120. In this regard, access network 120 may include a node 122, e.g., a mini-fiber node (MFN), a video-ready access device (VRAD) or the like. However, in another example node 122 may be omitted, e.g., for fiber-to-the-premises (FTTP) installations. Access network 120 may also transmit and receive communications between home network 160 and core network 110 relating to voice telephone calls, communications with web servers via the Internet 145 and/or other networks 140, and so forth.

Alternatively, or in addition, the network 100 may provide television services to home network 160 via satellite broadcast. For instance, ground station 130 may receive television content from television servers 112 for uplink transmission to satellite 135. Accordingly, satellite 135 may receive television content from ground station 130 and may broadcast the television content to satellite receiver 139, e.g., a satellite link terrestrial antenna (including satellite dishes and antennas for downlink communications, or for both downlink and uplink communications), as well as to satellite receivers of other subscribers within a coverage area of satellite 135. In one example, satellite 135 may be controlled and/or operated by a same network service provider as the core network 110. In another example, satellite 135 may be controlled and/or operated by a different entity and may carry television broadcast signals on behalf of the core network 110.

In one example, home network 160 may include a home gateway 161, which receives data/communications associated with different types of media, e.g., television, phone, and Internet, and separates these communications for the appropriate devices. The data/communications may be received via access network 120 and/or via satellite receiver 139, for instance. In one example, television data is forwarded to set-top boxes (STBs)/digital video recorders (DVRs) 162A and 162B to be decoded, recorded, and/or forwarded to television (TV) 163A and TV 163B for presentation. Similarly, telephone data is sent to and received from home phone 164; Internet communications are sent to and received from router 165, which may be capable of both wired and/or wireless communication. In turn, router 165 receives data from and sends data to the appropriate devices, e.g., personal computer (PC) 166, mobile devices 167A and 167B, XR device 170, IoT devices 180, and so forth. In one example, router 165 may further communicate with TV (broadly a display) 163A and/or 163B, e.g., where one or both of the televisions is a smart TV. In one example, router 165 may comprise a wired Ethernet router and/or an Institute for Electrical and Electronics Engineers (IEEE) 802.11 (Wi-Fi) router, and may communicate with respective devices in home network 160 via wired and/or wireless connections.

In one example, the XR device 170 comprises a device that is capable of rendering a virtual environment that, when experienced simultaneously with a surrounding real environment, creates an XR environment. For instance, the XR device 170 may comprise a head mounted display (HMD).

In one example, the IoT devices 180 comprise "smart" devices that are configured to monitor various conditions in the home (e.g., temperature, brightness, noise volume, etc.) and/or to react to certain detected conditions by adjusting the settings of the home systems that control these conditions (e.g., heating, air conditioning, lighting, speakers, security, etc.). In one example, the IoT devices may also include appliances (e.g., radios, televisions, refrigerators, etc.), fitness equipment (e.g., treadmills, stationary bicycles, etc.), and other devices that are capable of connecting to a network. The IoT devices 180 may also be configured to adjust the settings of the home systems and/or adjust other conditions within the home network 160 based on signals received from a centralized controller, such the home gateway 161. For instance, the IoT devices 180 may include a smart thermostat, a smart dimmer switch, an Internet-enabled radio or television, a smart treadmill, and/or another type of connected home device.

It should be noted that as used herein, the terms "configure" and "reconfigure" may refer to programming or loading a computing device with computer-readable/computer-executable instructions, code, and/or programs, e.g., in a memory, which when executed by a processor of the computing device, may cause the computing device to perform various functions. Such terms may also encompass providing variables, data values, tables, objects, or other data structures or the like which may cause a computer device executing computer-readable instructions, code, and/or programs to function differently depending upon the values of the variables or other data structures that are provided. For example, one or both of the STB/DVR 162A and STB/DVR 162B may host an operating system for presenting a user interface via TVs 163A and 163B, respectively. In one example, the user interface may be controlled by a user via a remote control or other control devices which are capable of providing input signals to a STB/DVR. For example, mobile device 167A and/or mobile device 167B may be equipped with an application to send control signals to STB/DVR 162A and/or STB/DVR 162B via an infrared transmitter or transceiver, a transceiver for IEEE 802.11 based communications (e.g., "Wi-Fi"), IEEE 802.15 based communications (e.g., "Bluetooth", "ZigBee", etc.), and so forth, where STB/DVR 162A and/or STB/DVR 162B are similarly equipped to receive such a signal. Although STB/DVR 162A and STB/DVR 162B are illustrated and described as integrated devices with both STB and DVR functions, in other, further, and different examples, STB/DVR 162A and/or STB/DVR 162B may comprise separate STB and DVR components.

Those skilled in the art will realize that the network 100 may be implemented in a different form than that which is illustrated in FIG. 1, or may be expanded by including additional endpoint devices, access networks, network elements, application servers, etc. without altering the scope of the present disclosure. For example, core network 110 is not limited to an IMS network. Wireless access network 150 is not limited to a UMTS/UTRAN configuration. Similarly, the present disclosure is not limited to an IP/MPLS network for VoIP telephony services, or any particular type of broadcast television network for providing television services, and so forth.

Figure 2:
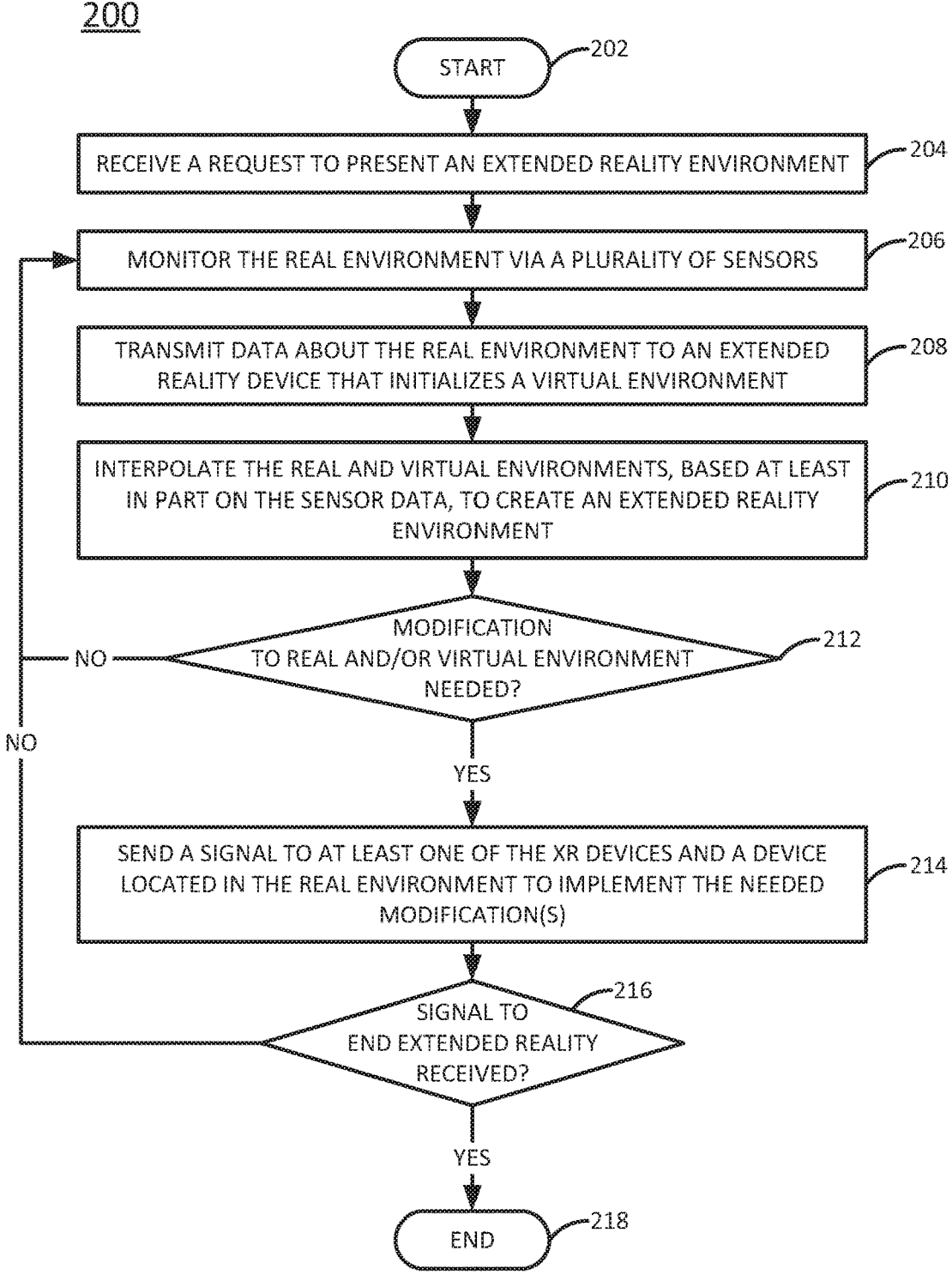
FIG. 2 illustrates a flowchart of a first example method for providing improved synchronization of real and virtual environments during extended reality experiences in accordance with the present disclosure.

To further aid in understanding the present disclosure, FIG. 2 illustrates a flowchart of a first example method 200 for providing improved synchronization of real and virtual environments during extended reality experiences in accordance with the present disclosure. In one example, the method 200 may be performed by a synchronization server that is configured to synchronize real and virtual environments, such as the synchronization server 115 illustrated in FIG. 1. However, in other examples, the method 200 may be performed by another device, such as the processor 402 of the system 400 illustrated in FIG. 4. For the sake of example, the method 200 is described as being performed by a processing system.

The method 200 beings in step 202. In step 204, the processing system may receive a request to present an XR environment. For instance, in one example, a user may log into an XR application (e.g., by transmitting a user ID and/or password to the processing system). In another example, the user may activate or power on an XR device, such as an HMD, which causes the HMD to connect to the processing system. The requested XR environment combines the real environment in which the user is located with a virtual environment.

In step 206, the processing system may monitor the real environment (i.e., the physical environment surrounding the user) via a plurality of sensors. The sensors may be integrated into an XR device, a computing device communicatively coupled to the XR device, or an IoT device deployed in the real environment (where the IoT device may monitor and/or control environmental conditions, user physical conditions, home appliances, and/or other conditions). The sensors may include, for example, temperature sensors (e.g., thermometers, thermistors, thermocouples, etc.), light sensors (e.g., photoelectric devices, photodetectors, etc.), imaging sensors (e.g., still or video cameras, infrared cameras, etc.), moisture sensors, noise sensors, pressure sensors (e.g., barometers, vacuum sensors, strain gauges, etc.), medical sensors (e.g., heart rate monitors, blood pressure monitors, glucose monitors, etc.), and/or other types of sensors. The sensors may expose their connectivity to the processing system via a hub or home gateway (such as home gateway 161 of FIG. 1), which allows the processing system to discover devices in the real environment that can provide information and/or be controlled to modify conditions in the real environment.

In optional step 208 (illustrated in phantom), the processing system may transmit data about the real environment to an XR device that initializes a virtual environment. In one example, the virtual environment may be initialized by the XR device based on stored information, such as user preferences. In one example, the XR device may also rely on known information about the real environment when initializing the virtual environment, in order to facilitate later integration of the virtual environment with the real environment.

For instance, the processing system may transmit information collected from the plurality of sensors. The transmitted information may include information regarding the current lighting, temperature, sound, and/or other conditions of the real environment. The processing system may also transmit information about known obstacles (e.g., physical obstacles) that are present in the real environment, and/or current physical attributes (e.g., heart rate, blood pressure, etc.) of the user.

In another example, step 208 may also involve making recommendations to the XR device to address any limitations imposed by the real environment on the virtual environment. For instance, certain physical features or conditions of the real environment may make it infeasible to render portions of the virtual environment.

In step 210, the processing system may interpolate the real environment and the virtual environment, based at least in part on the sensor data collected via the monitoring performed in step 206, to create an XR environment. As discussed above, the XR environment may combine elements of both the real environment and the virtual environment into a single "extended reality" or XR environment. For instance, the XR environment may insert virtual items, via a display of the XR device, into a view of the real environment.

In one example, interpolation of the real environment and the virtual environment involves evaluating a difference between the user's target XR environment (e.g., an XR environment characterized by a predefined set of ideal features or parameters) and the actual XR environment that is being presented to the user (e.g., by the XR system). Interpolation may further involve determining one or more modifications to be made to the real environment and/or the virtual environment in order to create an actual XR environment that is closer to the target XR environment. For instance, a modification to the real environment may involve adjusting ambient lighting in the real environment (e.g., dimming or brightening the light, focusing a spotlight on an object versus utilizing high illumination to light an entire room, etc.). A modification to the virtual environment may involve moving a location of a virtual object.

In step 212, the processing system may determine whether a modification to the real environment and/or the virtual environment is necessary, based on the interpolating. For instance, as discussed above, a modification may be made to the real environment and/or the virtual environment so that the resultant actual XR environment is more like the target XR environment. Determining whether a modification is necessary may involve determining not just the nature, but also the extent of the modification (e.g., dim lights in real environment by thirty percent, move virtual object in virtual environment two feet to the left, etc.).

If the processing system concludes in step 212 that no modification to the real environment or the virtual environment is necessary, then the method 200 may return to step 206, and the processing system may proceed as described above to continue monitoring and interpolating the real and virtual environments.

If, however, the processing system concludes in step 212 that a modification to the real environment and/or the virtual environment is necessary, then the method 200 may proceed to step 214. In step 214, the processing system may send a command to at least one of the XR device and a device located in the real environment (e.g., an IoT device or other smart device) to implement the necessary modification(s). For instance, a command sent to a device located in the real environment may control the device located in the real environment, so that difference between the target XR environment and the actual XR environment is smaller (e.g., so that the real environment is better synchronized to the virtual environment). For instance, the processing system may send a command to a smart thermostat located in the real environment to raise or lower the temperature of the real environment. As another example, the processing system could also send a command to a smart lighting system located in the real environment to dim or brighten the lighting in the real environment. As a further example, the processing system could send a command to an Internet enabled radio or smart sound system to raise or lower the volume of music being played in the real environment.

In step 216, the processing system may determine whether a signal has been received to end the XR experience. For instance, the user may send a signal via the XR device (e.g., by pressing a button, powering down the XR device, giving an audio command, or the like).

If the processing system concludes in step 216 that a signal has been received to end the XR environment, then the method 200 may proceed to step 218, where the method 200 ends.

Alternatively, if the processing system concludes in step 216 that a signal has not been received to end the XR environment, then the method 200 may return to step 210, and the processing system may proceed as described above to interpolate the virtual environment and the real environment.

In one example, where the same XR environment is being experienced by multiple users, the processing system may perform the method 200 for each of the users (e.g., including interpolating between the real and virtual environments to minimize a difference between the actual XR environment experienced by each user and the target XR environment for each user). If the necessary modifications for two or more users conflict, the processing system may prompt the users for further instructions, or compute an average of the necessary modifications.

In further examples, the processing system may intercept messages and alerts from external software (e.g., text messages, voice messages, video messages, etc.) or from the real environment (e.g., a door bell or a phone ringing) and may modulate the signals if the messages and alerts to minimize the impact on the XR environment.

In further examples still, the processing system may ease a user's transition into and out of the XR environment. For instance, the user may be experiencing the XR environment while running on a treadmill. When the user sends a signal to exit the XR experience, the processing system may send a command to the treadmill to gradually slow the treadmill's speed (e.g., over a period of time such as 30 seconds, one minute, and so on), rather than stop the treadmill suddenly and risk injury to the user. Alternatively, the lighting of the XR environment may be relatively dim. When the user sends a signal to exit the XR environment, the processing system may send a command to the lighting system of the real environment to gradually brighten the ambient lighting.

Thus, the method 200 minimizes the burden on an XR device or system to communicate with devices in the real environment. Instead, the processing system may mediate requests from the XR device and from the devices in the real world to improve users' transitions into, out of, and within an XR environment.

Figure 3:
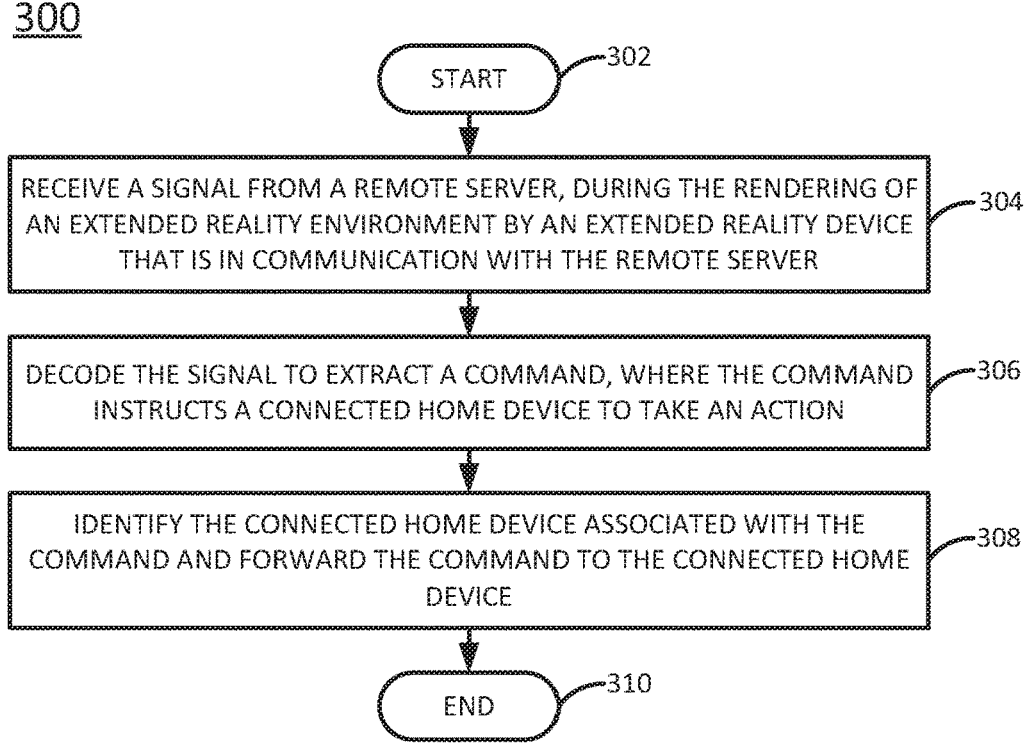
FIG. 3 illustrates a flowchart of a second example method for providing improved synchronization of real and virtual environments during extended reality experiences in accordance with the present disclosure.

FIG. 3 illustrates a flowchart of a second example method 300 for providing improved synchronization of real and virtual environments during extended reality experiences in accordance with the present disclosure. In one example, the method 300 may be performed by a "controller," which may be a device that is configured for the decoding of commands from a signal sent by a centralized server and for the control of connected home devices, such as the IoT devices 180 or the mobile devices 167A and 167B illustrated in FIG. 1. For instance, the method 300 may be performed by the home gateway 161 of FIG. 1. However, in other examples, the controller may be another device. For instance, signals encoding the commands for controlling the connected home devices may be received by the connected home devices directly. For the sake of example, the method 300 is described as being performed by a processing system.

The method 300 begins in step 302. In step 304, the processing system may receive a signal from a remote server (e.g., synchronization server 115 of FIG. 1), where the signal is received during the rendering of an XR environment by an XR device that is in communication with the remote server.

In step 306, the processing system may decode the signal to extract a command, where the command instructs a connected home device (which may be communicatively coupled to the processing system) to take an action. For instance, the instruction may specify how the settings of a device or system controlled by the connected home device should be adjusted. For instance, the instruction may instruct a smart thermostat to lower the temperature, or may instruct a smart dimming switch the dim the lights, or the like during the rendering of the XR environment.

In step 308, the processing system may identify the connected home device that is associated with the command and forward the command to the connected home device.

The method 300 ends in step 310.

Although not expressly specified above, one or more steps of the method 200 or the method 300 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 or FIG. 3 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the examples of the present disclosure.

FIG. 4 depicts a high-level block diagram of a computing device specifically programmed to perform the functions described herein. For example, any one or more components or devices illustrated in FIG. 1 or described in connection with the method 200 or the method 300 may be implemented as the system 400. For instance, a server (such as might be used to perform the method 200) or a home gateway or other controller (such as might be used to perform the method 300) could be implemented as illustrated in FIG. 4.

As depicted in FIG. 4, the system 400 comprises a hardware processor element 402, a memory 404, a module 405 for providing improved synchronization of real and virtual environments during extended reality experiences, and various input/output (I/O) devices 406.

The hardware processor 402 may comprise, for example, a microprocessor, a central processing unit (CPU), or the like. The memory 404 may comprise, for example, random access memory (RAM), read only memory (ROM), a disk drive, an optical drive, a magnetic drive, and/or a Universal Serial Bus (USB) drive. The module 405 for providing improved synchronization of real and virtual environments during extended reality experiences may include circuitry and/or logic for performing special purpose functions relating to the operation of a home gateway or XR server. The input/output devices 406 may include, for example, a camera, a video camera, storage devices (including but not limited to, a tape drive, a floppy drive, a hard disk drive or a compact disk drive), a receiver, a transmitter, a speaker, a display, a speech synthesizer, an output port, and a user input device (such as a keyboard, a keypad, a mouse, and the like), or a sensor.

Although only one processor element is shown, it should be noted that the computer may employ a plurality of processor elements. Furthermore, although only one computer is shown in the Figure, if the method(s) as discussed above is implemented in a distributed or parallel manner for a particular illustrative example, i.e., the steps of the above method(s) or the entire method(s) are implemented across multiple or parallel computers, then the computer of this Figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for providing improved synchronization of real and virtual environments during extended reality experiences (e.g., a software program comprising computer-executable instructions) can be loaded into memory 404 and executed by hardware processor element 402 to implement the steps, functions or operations as discussed above in connection with the example method 200 or the example method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for providing improved synchronization of real and virtual environments during extended reality experiences (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a preferred example should not be limited by any of the above-described example examples, but should be defined only in accordance with the following claims and their equivalents.

What is claimed is:

1. A method comprising:
    monitoring, by a processing system, conditions in a real environment in which a user is present, wherein the monitoring is performed by collecting data about the conditions from a plurality of sensors located in the real environment;
    transmitting, by the processing system, the data about the conditions to an extended reality device that is present in the real environment, where the extended reality device is configured to render a virtual environment;
    interpolating, by the processing system, between the real environment and the virtual environment, based at least in part on the conditions, to determine an actual extended reality environment that is being presented to the user;
    identifying, by the processing system, that the user wishes to exit the actual extended reality environment;
    determining, by the processing system, a modification to at least one of the conditions to ease a transition of the user from the actual extended reality environment to the real environment, wherein the modification comprises adjusting a speed of a fitness equipment being used by the user over a period of time, wherein the determining comprises:
        computing a first modification to the at least one of the conditions for the user;
        determining that the first modification conflicts with a second modification computed for another user to whom the actual extended reality environment is being presented; and
        computing the modification as an average of the first modification and the second modification; and
    sending, by the processing system, a first signal to the fitness equipment, based on the interpolating, wherein the first signal instructs the fitness equipment to adjust a speed of the fitness equipment.

2. The method of claim 1, wherein at least some sensors of the plurality of sensors are integrated into the extended reality device.

3. The method of claim 1, wherein at least some sensors of the plurality of sensors are integrated into a connected home device.

4. The method of claim 1, wherein at least some sensors of the plurality of sensors are integrated into a wearable device worn by the user.

5. The method of claim 1, wherein the virtual environment is initialized based on a stored user preference.

6. The method of claim 1, wherein the virtual environment is initialized based on knowledge of the real environment inferred from the data about the conditions.

7. The method of claim 1, wherein the interpolating comprises:

identifying, by the processing system, a target extended reality environment that should be presented to the user; and determining, by the processing system, a difference between the actual extended reality environment that is being presented to the user and the target extended reality environment that should be presented to the user, wherein the adjusting the speed of the fitness equipment is expected to minimize the difference.

8. The method of claim 7, wherein the target extended reality environment is characterized by a predefined set of ideal parameters.

9. The method of claim 1, further comprising:
sending, by the processing system, a second signal to the extended reality device based on the interpolating, wherein the second signal instructs the extended reality device to move a digital object from a first location in the virtual environment to a second location in the virtual environment, wherein a movement of the digital object is expected to further to ease a transition of the user from the actual extended reality environment to the real environment.

10. The method of claim 1, further comprising:
sending, by the processing system, a second signal to a smart thermostat based on the interpolating, wherein the second signal instructs the smart thermostat to adjust a temperature of the real environment, wherein an adjustment of the temperature is expected to further to ease a transition of the user from the actual extended reality environment to the real environment.

11. The method of claim 1, further comprising:
sending, by the processing system, a second signal to a smart lighting system based on the interpolating, wherein the second signal instructs the smart lighting system to adjust a lighting level of the real environment, wherein an adjustment of the lighting level is expected to further to ease a transition of the user from the actual extended reality environment to the real environment.

12. The method of claim 11, wherein the adjustment to the lighting level of the real environment is made over the period of time.

13. The method of claim 1, further comprising:
sending, by the processing system, a second signal to a smart lighting system based on the interpolating, wherein the second signal instructs the smart lighting system to adjust a location in the real environment in which lighting is provided, wherein an adjustment of the location in the real environment in which the lighting is provided is expected to further to ease a transition of the user from the actual extended reality environment to the real environment.

14. The method of claim 1, further comprising:
sending, by the processing system, a second signal to a smart audio system based on the interpolating, wherein the second signal instructs the smart audio system to adjust a volume level of audio content being played in the real environment, wherein an adjustment of the volume level is expected to further to ease a transition of the user from the actual extended reality environment to the real environment.

15. The method of claim 1, further comprising:
intercepting, by the processing system, an alert from software external to the processing system; and modulating, by the processing system, a signal containing the alert to minimize an impact of the alert on the actual extended reality environment.

16. The method of claim 15, wherein the alert is a message received on a phone.

17. The method of claim 1, wherein the processing system connects to the plurality of sensors via a home gateway.

18. A non-transitory computer-readable medium storing instructions which, when executed by a processor, cause the processor to perform operations, the operations comprising:
monitoring conditions in a real environment in which a user is present, wherein the monitoring is performed by collecting data about the conditions from a plurality of sensors located in the real environment;
transmitting the data about the conditions to an extended reality device that is present in the real environment, where the extended reality device is configured to render a virtual environment;
interpolating between the real environment and the virtual environment, based at least in part on the conditions, to determine an actual extended reality environment that is being presented to the user;
identifying that the user wishes to exit the actual extended reality environment;
determining a modification to at least one of the conditions to ease a transition of the user from the actual extended reality environment to the real environment, wherein the modification comprises adjusting a speed of a fitness equipment being used by the user over a period of time, wherein the determining comprises:
computing a first modification to the at least one of the conditions for the user;
determining that the first modification conflicts with a second modification computed for another user to whom the actual extended reality environment is being presented; and
computing the modification as an average of the first modification and the second modification; and
sending a first signal to the fitness equipment, based on the interpolating, wherein the first signal instructs the fitness equipment to adjust a speed of the fitness equipment.

19. A device comprising:
a processor; and
a computer-readable medium storing instructions which, when executed by the processor, cause the processor to perform operations, the operations comprising:
monitoring conditions in a real environment in which a user is present, wherein the monitoring is performed by collecting data about the conditions from a plurality of sensors located in the real environment;
transmitting the data about the conditions to an extended reality device that is present in the real environment, where the extended reality device is configured to render a virtual environment;
interpolating between the real environment and the virtual environment, based at least in part on the conditions, to determine an actual extended reality environment that is being presented to the user;
identifying that the user wishes to exit the actual extended reality environment;
determining a modification to at least one of the conditions to ease a transition of the user from the actual extended reality environment to the real environment, wherein the modification comprises adjusting a speed of a fitness equipment being used by the user over a period of time, wherein the determining comprises:
   computing a first modification to the at least one of the conditions for the user;
   determining that the first modification conflicts with a second modification computed for another user to whom the actual extended reality environment is being presented; and
   computing the modification as an average of the first modification and the second modification; and
sending a first signal to the fitness equipment, based on the interpolating, wherein the first signal instructs the fitness equipment to adjust a speed of the fitness equipment.

* * * * *